(12) United States Patent
Kishnani et al.

(10) Patent No.: US 7,941,783 B1
(45) Date of Patent: May 10, 2011

(54) SOFTWARE DEVELOPMENT TOOL THAT SUPPORTS USE OF A DESIGN-TIME DATA FEED

(75) Inventors: Amit C. Kishnani, Foster City, CA (US); Jorge Taylor, Burlingame, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1064 days.

(21) Appl. No.: 11/733,620

(22) Filed: Apr. 10, 2007

(51) Int. Cl.
*G06F 9/44* (2006.01)
*G06F 15/16* (2006.01)
(52) U.S. Cl. .................................... 717/100; 709/231
(58) Field of Classification Search .................. 717/100; 709/231
See application file for complete search history.

(56) References Cited

U.S. PATENT DOCUMENTS

| | | | | |
|---|---|---|---|---|
| 6,035,119 | A * | 3/2000 | Massena et al. | 717/100 |
| 6,625,803 | B1 * | 9/2003 | Massena et al. | 717/100 |
| 7,316,003 | B1 * | 1/2008 | Dulepet et al. | 717/111 |
| 7,404,176 | B2 * | 7/2008 | Reeder et al. | 717/104 |
| 7,600,215 | B2 * | 10/2009 | Cherdron et al. | 717/105 |
| 7,631,260 | B1 * | 12/2009 | Riggs et al. | 715/716 |
| 2004/0123238 | A1 * | 6/2004 | Hefetz et al. | 715/513 |
| 2004/0133898 | A1 * | 7/2004 | Cherdron et al. | 719/332 |
| 2006/0005162 | A1 * | 1/2006 | Tseng et al. | 717/107 |
| 2007/0073701 | A1 * | 3/2007 | Miller et al. | 707/10 |
| 2007/0168936 | A1 * | 7/2007 | Shaburov et al. | 717/106 |
| 2007/0208759 | A1 * | 9/2007 | von Koch et al. | 707/100 |

OTHER PUBLICATIONS

U.S. Appl. No. 10/975,036, filed Oct. 27, 2004, Heidi Bauer Williams.
U.S. Appl. No. 11/733,596, filed Apr. 10, 2007, Amit C. Kishnani.

* cited by examiner

*Primary Examiner* — Anna Deng
*Assistant Examiner* — Qing Chen
(74) *Attorney, Agent, or Firm* — Kilpatrick Townsend & Stockton LLP

(57) ABSTRACT

A software application development tool supports a specified design-time data feed. A software application developer can interact with the development tool to specify a design-time data feed that is to be used during development of an application in place of a given run-time data feed that is not available for access by the application. For instance, a software application developer may code the application with reference(s) to the unavailable run-time data feed, and the developer may specify to the development tool a design-time data feed for such referenced run-time data feed. The development tool then manages correlation of the specified design-time feed to the run-time feed such that references to the run-time feed in the application under development instead trigger access to the specified design-time feed by the development tool. When deployed in a run-time environment, the software application's references to the run-time feed trigger access to such run-time feed.

26 Claims, 8 Drawing Sheets

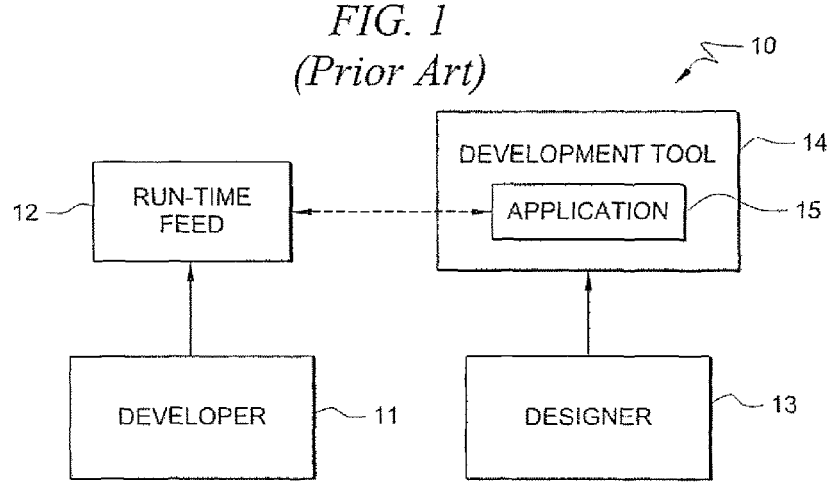
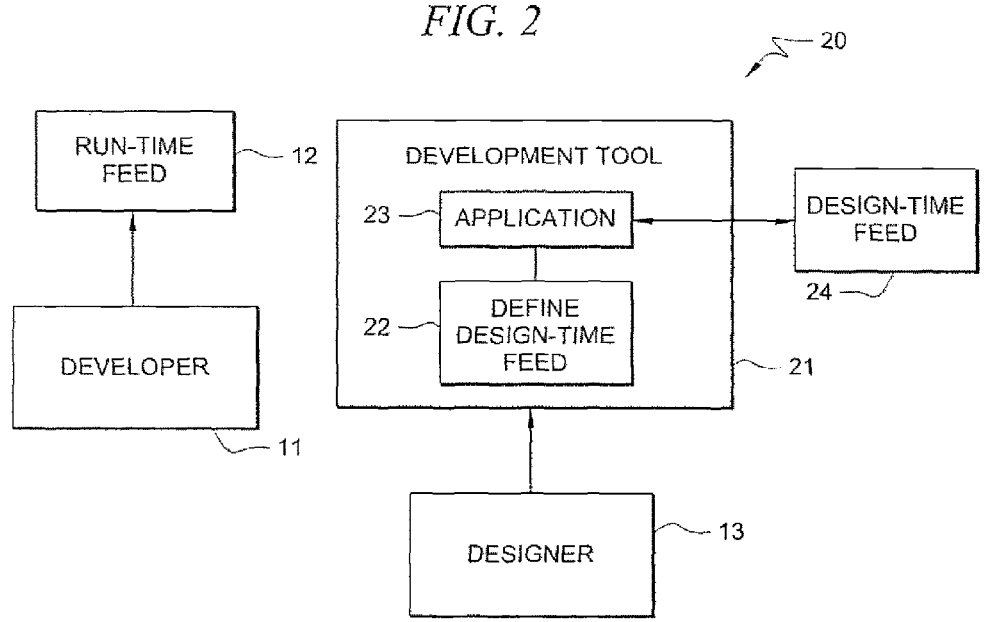

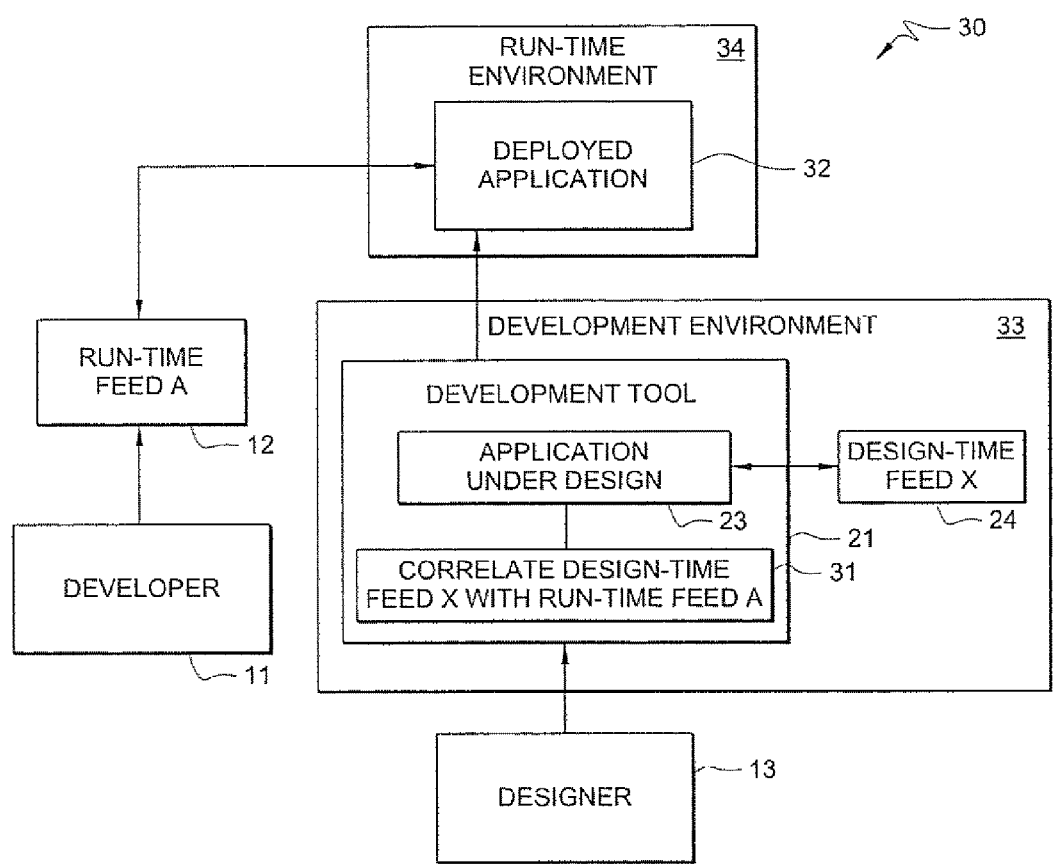

FIG. 7

RECEIVE, BY A SOFTWARE DEVELOPMENT TOOL, IDENTIFICATION OF A DESIGN-TIME DATA FEED FOR AT LEAST ONE RUN-TIME DATA FEED THAT IS REFERENCED IN A SOFTWARE APPLICATION UNDER DEVELOPMENT — 71

ACCESS, BY SAID SOFTWARE DEVELOPMENT TOOL, SAID DESIGN-TIME DATA FEED IN PLACE OF SAID REFERENCED RUN-TIME DATA FEED — 72

FIG. 8

DETERMINE, BY A SOFTWARE DEVELOPMENT TOOL, WHETHER ACCESS TO A RUN-TIME FEED REFERENCED IN A SOFTWARE APPLICATION UNDER DEVELOPMENT IS AVAILABLE TO SAID SOFTWARE APPLICATION UNDER DEVELOPMENT — 81

WHEN DETERMINED UNAVAILABLE, PROMPT A USER TO DEFINE A DESIGN-TIME FEED TO BE USED BY THE SOFTWARE DEVELOPMENT TOOL IN PLACE OF THE REFERENCED RUN-TIME FEED — 82

WHEN DETERMINED UNAVAILABLE, ACCESS, BY THE SOFTWARE DEVELOPMENT TOOL, THE CORRESPONDING DEFINED DESIGN-TIME FEED IN PLACE OF THE REFERENCED RUN-TIME FEED — 83

WHEN DETERMINED AVAILABLE, ACCESS, BY THE SOFTWARE DEVELOPMENT TOOL, THE REFERENCED RUN-TIME FEED — 84

FIG. 9

DETERMINE, BY A SOFTWARE DEVELOPMENT TOOL, FROM METADATA ASSOCIATED WITH A SOFTWARE APPLICATION UNDER DEVELOPMENT, WHETHER DESIGN-TIME DATA FEED IS DEFINED FOR AT LEAST ONE RUN-TIME DATA FEED REFERENCED IN THE SOFTWARE APPLICATION UNDER DEVELOPMENT — 91

FOR ANY DETERMINED DESIGN-TIME DATA FEED DEFINED FOR AT LEAST ONE RUN-TIME DATA FEED REFERENCED IN THE APPLICATION UNDER DEVELOPMENT, THE SOFTWARE DEVELOPMENT TOOL ACCESSING SUCH DESIGN-TIME DATA FEED IN PLACE OF THE REFERENCED AT LEAST ONE RUN-TIME DATA FEED FOR WHICH THE DESIGN-TIME DATA FEED IS DEFINED — 92

SOFTWARE DEVELOPMENT TOOL THAT SUPPORTS USE OF A DESIGN-TIME DATA FEED

TECHNICAL FIELD

The following description relates generally to software development tools, and more specifically to a software development tool that supports use of a design-time data feed to promote a developer's development of a software application that references a run-time data feed when such run-time data feed is not available during the application's development.

BACKGROUND

Many software development tools are available today for use by software designers (or "developers") in creating various types of software applications. Software "designers" and "developers" are used interchangeably herein, and generally refer to anyone involved with using a software development tool for authoring, designing, or otherwise creating or modifying a software application. In a software development environment, a developer may interact with a software development tool for writing code, compiling the code, testing or debugging the code, and packaging the resulting application for deployment in a run-time environment. The software development tool may be implemented as a software application that is stored to a computer-readable medium and executed by a computer processor to perform the tasks associated with aiding a developer in the development of a software application. As one example, an integrated development environment (IDE) is commonly used for developing software applications. In general, an IDE is a programming environment that has been packaged as a software application program, typically including a code editor, a compiler, a debugger, and a graphical user interface (GUI) builder. The IDE may be a stand-alone application or may be included as part of one or more existing and compatible applications. IDEs provide a user-friendly framework for many modern programming languages, such as Visual Basic, Java, and PowerBuilder. IDEs for developing markup language (e.g., HTML) applications are among the most commonly used.

Thus, IDEs provide software tools that allow a developer (e.g., a web developer) to create web pages, websites, interactive applications, and the like for use by end users (e.g., visitors to websites). Various IDEs exist in the current marketplace, such as DREAMWEAVER®, available from Adobe Systems Incorporated, and FRONTPAGE®, available from Microsoft Corporation. DREAMWEAVER is an IDE that allows web developers to design Hypertext Markup Language (HTML) web pages in both a code editor and a graphical-based design time environment. DREAMWEAVER also allows the developer to design in other languages, such as, for example, Extensible Markup Language (XML), Extensible HTML (XHTML), Active Server Page (ASP), COLDFUSION™ Markup Language (CFML™), and the like.

An IDE may allow a developer to create a document in an environment that includes both a text-based code view and a graphical-based design view. The code view renders the source code as text in a portion of the screen and allows the developer to see and manipulate the source code in the document file. For example, the developer may write and edit HTML or Cascading Style Sheets (CSS) code in the code view. The design view, on the other hand, is a What You See Is What You Get (WYSIWYG) view of the document that allows the user to visually manipulate the interpreted and graphically laid-out version of the document, such as, for example, by dragging, dropping, cutting, and pasting visual components. As the developer works, changes to the document are reflected in both the code view and the design view.

Many software applications depend on a received data feed. For instance, a software application may read data from a database or other data source, and present the data to a user and/or otherwise process the read data. For example, a webpage may read data from a database and present such data on a portion of its user interface, and/or a webpage may receive and present dynamic data, such as an RSS feed. Difficulty often arises when a designer is attempting to develop a software application that is to receive a data feed before such data feed is actually available to the software application. For example, a first developer may be developing a data feed that is to be available to a software application that is being designed/created by a designer, wherein the designer's work on creation of the software application may be impeded awaiting development of the data feed.

FIG. 1 shows an exemplary scenario 10 commonly encountered in the prior art. In this example, a developer 11 is developing a run-time feed 12, which may be, as examples, a dynamic feed, such as an RSS feed, streaming data, a dynamically updatable database, etc., or a static feed, such as a static database or file. Further, a designer 13 desires to create an application 15 that accesses such run-time feed 12. For instance, application 15 may be a website or other software application that reads data from run-time feed 12 and presents such data to a user (and/or otherwise processes the read data). To create such application 15, designer 13 interacts with a development tool 14, such as an IDE.

As this exemplary scenario 10 illustrates, dependency exists between the application 15 that is under development and the run-time feed 12, which is also under development (or is otherwise not yet available for access by the application 15). Thus, designer 13 may be forced to wait for the run-time feed 12 to be developed before being able to proceed with interacting with development tool 14 for designing the application 15. This may undesirably delay work on designing application 15.

Alternatively, to attempt to proceed with design of application 15 before run-time feed 12 becomes available, designer 13 may employ a temporary work-around in which the designer codes the application 15 such that application 15 does not reference run-time feed 12. In this manner, the designer may develop parts of the application 15 that are not dependent on the run-time feed 12 being present. For instance, the designer may code parts of the application that do not reference the unavailable run-time feed 12. Then, when run-time feed 12 becomes available, designer 13 may code the remaining portions of application 15 which are dependent on the run-time feed. As another example, before run-time feed 12 becomes available, designer 13 may initially code application 15 to reference some data feed that is currently available (e.g., an existing database, etc.), and then when run-time code 12 becomes available, designer 13 may modify the code to instead reference such run-time feed 12. Such work-around techniques become undesirably burdensome on the designer to manage, and they are prone to human error.

Accordingly, a desire exists for a software development tool, such as an IDE, that aids in eliminating the dependency in the workflow between the application designer and the data feed developer. Thus, a desire exists for a software development tool that aids in alleviating the dependency on a run-time feed being available during development of an application that references such run-time feed, while minimizing the burden on the application designer.

BRIEF SUMMARY

The present invention is directed to systems and methods in which a software application development tool supports a design-time data feed. In certain embodiments, a software application developer can interact with a development tool to specify a design-time data feed that is to be used during development in place of a given run-time feed that is not yet available for access by the application under development. For instance, a software application developer may code the application under development with reference(s) to the unavailable run-time data feed, and the developer may specify to the development tool a design-time data feed that is to be used in place of such referenced run-time data feed during the development of the application. The development tool then manages correlation of the specified design-time feed to the run-time feed such that references to the run-time feed in the application under development instead trigger access to the specified design-time feed by the development tool. Of course, when deployed in a run-time environment, the software application's references to the run-time feed trigger access to such run-time feed.

By supporting the use of a design-time feed in this manner, the development tool enables the application developer to proceed with development of the application without the referenced run-time data feed being available, and eliminates the burden from the developer in managing a work-around to so proceed. As mentioned above, traditionally, software application designers (e.g., web page designers) depend on a referenced run-time data feed being available from a data developer, which introduces a dependency in the application development workflow. Alternatively, the software application designers (or "developers") may be burdened with managing a work-around in their coding techniques to avoid referencing a run-time data feed in an application under development until a time that such run-time data feed becomes available for access by the application. Embodiments of the present invention advantageously provide a software application development tool that alleviates the dependency in the application development workflow on availability of a referenced run-time data feed by enabling the application designer to specify a design-time feed. Further, the development tool alleviates the burden from the developer in managing a work-around to avoid referencing in the code of the application under development a run-time data feed that is not yet available, as the development tool may receive identification of a design-time data feed and can manage the correlation of the design-time data feed that is to be used in place of a referenced run-time data feed that is not yet available.

Thus, according to embodiments of the present invention, the software application designer (or "developer") can specify a design-time feed to the development tool (e.g., a software code authoring tool), wherein such design-time feed is only used by the development tool in place of a run-time feed that is referenced by the application under development but which is not available to the application for some reason (e.g., the run-time feed is not yet developed, is not yet active, is not yet stored to a location accessible by the application, the application does not yet have access rights granted to it, etc.). The design-time feed may be any sample or representative feed that is to be used in place of the run-time feed during development of the application when the run-time feed is not available. Preferably, the design-time data feed possesses characteristics consistent with a referenced run-time data feed, such that the design-time data feed is fairly representative of the referenced run-time data feed. Thus, certain embodiments of the present invention provide a software development tool that supports use of a specified design-time data feed by the development tool during the application development stage, and eliminates the dependency in the workflow between the software application designer and the data feed developer. As such, the specified design-time feed provides an alternate pathway for the application developer to work within the development tool when authoring or prototyping, instead of depending on the availability of a run-time feed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows a traditional software application development scenario in which the workflow for developing a software application that references a run-time data feed is dependent on the availability of such referenced run-time data feed;

FIG. 2 shows an exemplary scenario according to one embodiment of the present invention, wherein a software application development tool is provided that supports use of a specified design-time feed such that the workflow for developing a software application that references a run-time data feed is not dependent on the availability of such referenced run-time data feed;

FIG. 3 shows another exemplary scenario according to an embodiment of the present invention;

FIG. 7 shows a flow diagram illustrating an exemplary operational flow of a software development tool according to one embodiment of the present invention;

FIG. 8 shows a flow diagram illustrating another exemplary operational flow of a software development tool according to one embodiment of the present invention;

FIG. 9 shows a flow diagram illustrating yet another exemplary operational flow of a software development tool according to one embodiment of the present invention.

DETAILED DESCRIPTION

Figure 4:
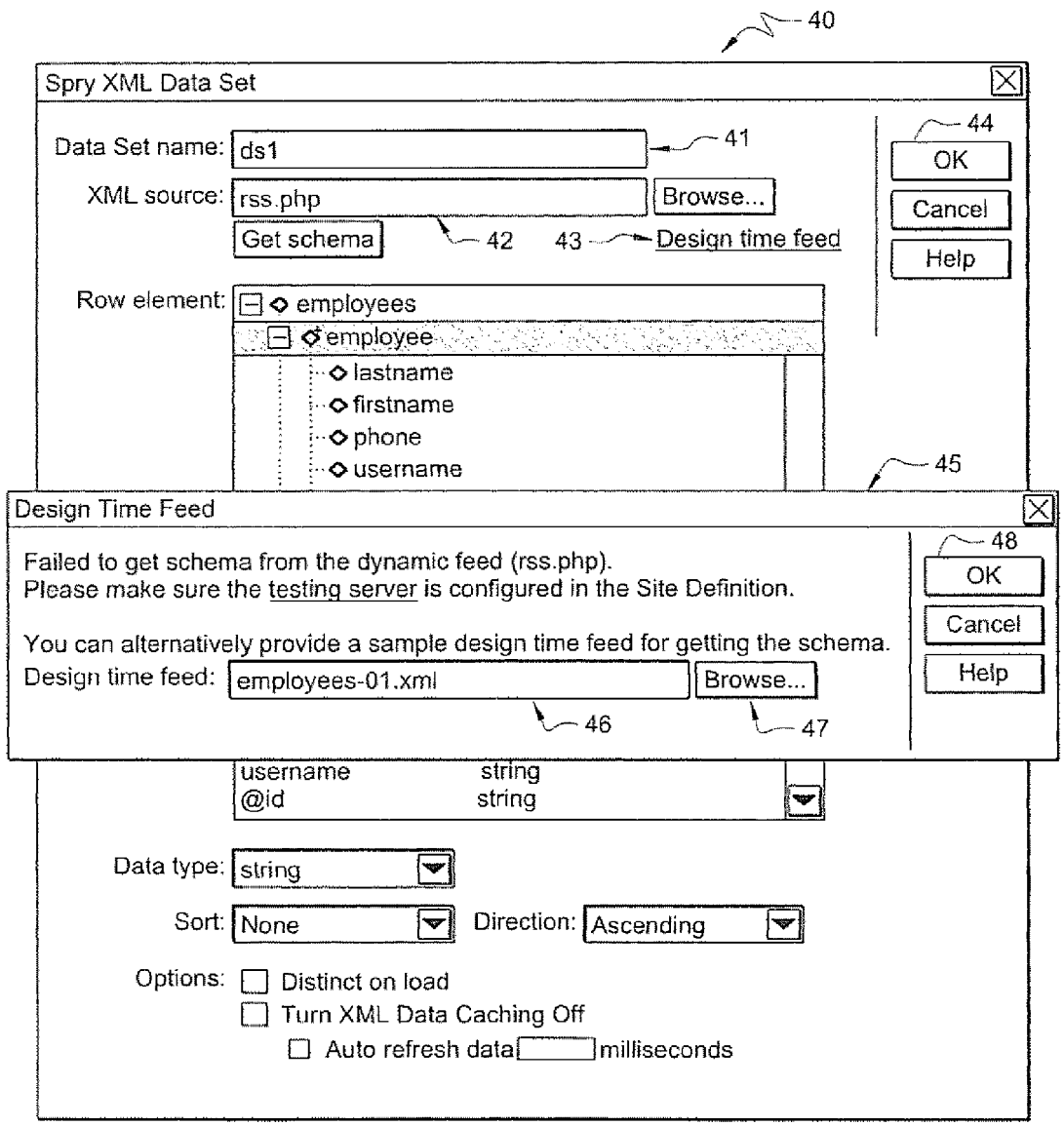
FIG. 4 shows an exemplary user interface that may be output by a software development tool according to one embodiment of the present invention.

FIG. 2 shows an exemplary scenario 20 according to one embodiment of the present invention. As in FIG. 1, a designer 13 desires to create an application 23 that, when deployed, accesses a run-time feed 12. For instance, application 23 may be a website or other software application that reads data from run-time feed 12 and presents such data to a user (and/or otherwise processes the read data). Further, as in FIG. 1, a developer 11 is developing such run-time feed 12, which may be a dynamic feed, such as an RSS feed, streaming data, a dynamically updatable database, etc., or a static feed, such as a static database or file. Alternatively, run-time feed 12 may be developed, but it may, for some reason, not be available for access by application 23. As examples, run-time feed 12 may not be stored to a location accessible by application 23, or application 23 may not yet have access rights granted to it for accessing run-time feed 12.

To create application 23, designer 13 interacts with a software development tool 21, which may be an IDE or other suitable software development tool, as examples. Software development tool 21 may comprise computer-executable software code stored to a computer-readable medium that, when executed by a computer causes the computer to perform various operations for aiding designer 13 in developing application 23, including the operations described further herein. According to this exemplary embodiment, development tool 21 supports, in operational block 22, defining of a design-time feed 24 that is to be used during development of application 23 in place of run-time feed 12. For example, development tool 21 may support defining of a design-time feed 24 that is to be accessed, during development of application 23, instead of accessing the run-time feed 12 that is referenced in the code of application 23. In this manner, development tool 21 aids designer 13 in proceeding with development of application 23 before run-time feed 12 becomes available.

In certain embodiments, the designer 13 interacts with development tool 21 to specify, in operational block 22, a given run-time feed 12 to which the design-time feed 24 corresponds. As such, the designer 13 can continue to code the application 23 with such code making reference to the run-time feed 12, and the development tool 21 will recognize that since the run-time feed 12 is not yet available, the specified design-time feed 24 is to be accessed in place of the referenced run-time feed 12. For instance, in certain embodiments, development tool 21 may recognize that a run-time data feed 12 that is referenced in the code of application 23 is not available for access by such application 23, and may in response to such recognition inform the designer 13 of such unavailability of the referenced run-time data feed 12. Further, development tool 21 may provide the designer 13 with an opportunity to specify, in operational block 22, a corresponding representative design-time data feed 24 that is available for access by the application 23 which may be accessed in place of the referenced run-time data feed 12 during the development stages of application 23. An exemplary user interface that may be employed by development tool 21 for receiving from designer 13 identification of such design-time data feed 24 in certain embodiments is described further below with reference to FIG. 4.

Thus, according to embodiments of the present invention, software application development tool 21 supports use of a specified design-time feed 24 such that the workflow for developing software application 23 that references a run-time data feed 12 is not dependent on the availability of such referenced run-time data feed 12, but instead the development tool 21 is operable to access the specified design-time feed 24 in response to the application's reference(s) to the unavailable run-time feed 12. Of course, when the run-time feed 12 becomes available, the application 23 can be deployed with its references to the run-time feed 12 actually causing access to such available run-time feed 12. Further, in certain embodiments, the development tool 21 may recognize when the referenced run-time data feed 12 becomes available to the application 23, and may either a) notify the designer 13 of this availability and provide the designer 13 with an opportunity to remove the application of the specified design-time feed 24, or b) autonomously use the referenced run-time data feed 12 whenever it is available, as examples.

FIG. 3 shows another exemplary scenario 30 according to an embodiment of the present invention. Again, a developer 11 is developing a run-time feed 12, which may be a dynamic feed, such as an RSS feed, streaming data, a dynamically updatable database, etc., or a static feed, such as a static database or file. Further, designer 13 desires to create an application 23 that, when deployed as deployed application 32 in a run-time environment 34, accesses such run-time feed 12. For instance, application 23 may be a website or other software application that, when deployed as a run-time website 32 on a web server for access by clients, is to read data from run-time feed 12 and present such data to a user (and/or otherwise processes the read data).

To create such application 23, designer 13 interacts with a software development tool 21 in development environment 33. According to this exemplary embodiment, development tool 21 is operable to, in operational block 31, correlate a design-time feed X (shown as design-time feed 24 in FIG. 3) with run-time feed 12. Thus, for instance, designer 13 may interact with development tool 21 to specify a design-time feed 24 that is to be used in place of run-time feed 12 in the development environment 33. In certain embodiments, metadata is associated with the application 23, wherein such metadata maintains information correlating the specified design-time feed 24 that is to be used in place of an unavailable run-time feed 12. Designer 13 may then proceed with coding application 23 to reference run-time feed 12 before run-time feed 12 is available, and development tool 21 will instead reference design-time feed 24 during the development. Then, when deployed, the deployed application 32 references run-time feed 12, rather than design-time feed 24. That is, when development tool 21 publishes the deployed application 32, it does so with deployed application 32 referencing run-time feed 12, rather than design-time feed 24. That is, the deployed application 32 is the production application that is placed into the run-time environment 34.

Development tool 21 may make the correlation 31 in any of several different ways. As one example, designer 13 may reference run-time feed 12 in the application under design 23, and development tool 21 may correlate such run-time feed 12 with a specified design-time feed 24 to be used in place of the occurrences of the references to the run-time feed 12 in the development environment 33. In certain embodiments, metadata is associated with the application 23, wherein such metadata maintains information correlating the specified design-time feed 24 that is to be used in place of an unavailable run-time feed 12, and development tool 21 may access such metadata to determine such correlation. Thus, the designer 13 may proceed to code the application 23 to reference the unavailable run-time feed 12, but the development tool 21 instead references the corresponding design-time feed 24 during the development environment 33. However, once deployed, the deployed application 32 maintains the designer's references to run-time feed 12, and thus will actually reference such run-time feed 12 since development tool 12 is no longer present (i.e., the development tool is not executing the deployed application in the run-time environment) to make the substitutions to design-time feed 24.

It should be recognized that in the above examples the designer 13 is not required to manage work-around techniques for avoiding referencing the unavailable run-time data feed 12 in the application 23 that is under development. Thus, this exemplary embodiment of development tool 21 reduces the burden on the designer 13, while permitting the designer 13 to proceed with development of application 23 even while the referenced run-time data feed 12 is unavailable to such application 23. Thus, according to embodiments of the present invention, software development tool 21 provides operability for recognizing a design-time feed 24 as such. That is, software development tool 21 is operable to understand that a specified design-time feed 24 is a data feed that is to be used only by the development tool 21 in development environment 33 as a stand-in or representative of an unavailable run-time data feed 12 that the application 23 under development references.

Preferably, the design-time data feed 24 possesses characteristics consistent with the referenced run-time data feed 12, such that the design-time data feed 24 is fairly representative of the referenced run-time data feed 12. As an example, if run-time data feed 12 is an RSS feed, design-time data feed 24 may be an RSS feed that is available for access by application 23 during the development stages. As another example, if run-time data feed 12 is a database, design-time data feed 24 may be a database that is available for access by application 23 during the development stages, wherein such design-time data feed (database) possesses similar characteristics to run-time data feed 12.

Turning now to FIG. 4, an exemplary user interface 40 that may be output by software development tool 21 according to one embodiment is shown. This exemplary interface 40 may be presented to a designer 13 to enable such designer 13 to define a data feed that is to be referenced in an application 23 that is under development. In this example, the interface 40 enables designer 13 to define a Spry XML data set. While application of embodiments of the present invention are not limited to the Spry framework, but are instead generally applicable to various coding techniques/frameworks, the example illustrated in FIG. 4 shows an example of coding in an application in the Spry framework. The Spry framework for AJAX is a well-known JavaScript library for web designers that provides functionality that allows designers to build pages that provide a richer experience for their users. It is designed to bring AJAX to the web design community who can benefit from AJAX, but are not well served by other frameworks. The Spry framework is a way to use the data capabilities that enable designers to incorporate XML data into their HTML documents using HTML, CSS, and a minimal amount of JavaScript, without the need for refreshing the entire page. The Spry framework is HTML-centric, and easy to implement for users with basic knowledge of HTML, CSS and JavaScript. The framework was designed such that the markup is simple and the JavaScript is minimal. The Spry framework can be used by anyone who is authoring for the web in their tool of choice. Thus, the exemplary XML data set shown in FIG. 4 provides a data pipe to get data asynchronously from a back-end data server and provide or deliver it to a front-end web page (i.e., the application under development in this example).

Interface 40 provides an input box 41 to receive a data set name, as well as an input box 42 to receive identification of a data feed source (e.g., an XML source). In this example, designer 13 specifies "ds1" as the data set name and "rss.php" as the XML source name. When the user clicks the OK button 44, the development tool 21 recognizes that the referenced ds1 data set name (and thus the "rss.php" data feed source) is not available for access by the application 23 that is under development. Thus, window 45 is presented notifying the user that development tool 21 failed to get schema from the dynamic feed rss.php. According to this exemplary embodiment, window 45 further informs the designer 13 that a design-time feed may be specified to be used in place of the "rss.php" run-time data feed during the development of application 23. Thus, window 45 provides an input box 46 for receiving from designer 13 identification of a design-time feed to be used by development tool 21 in place of the referenced rss.php run-time data feed. In this example, designer 13 specifies "employees-01.xml" as such a design-time feed that possesses similar characteristics to that of rss.php and can therefore be used by development tool 21 in place of the referenced rss.php run-time data feed during development of application 23. In this example, window 45 further provides a browse button 47 that when activated allows the designer 13 to browse through the system to search for a data feed that may be desirable to use as a design-time feed in place of the referenced run-time data feed. Once the design-time feed, if any, is specified by the designer 13, the designer 13 may click OK button 48. Thus, in this example, development tool 21 knows that if the referenced rss.php run-time data source is unavailable, to instead access the specified design-time data feed "employees-01.xml" in place thereof.

According to one embodiment, a data set, such as data set "ds1" in the example of FIG. 4, is associated with two source feeds, in order of precedence:

a) a design-time feed (optional) if specified, takes precedence; and b) an run-time feed (required), but does not need to be "active" (or available), if a design-time feed is supplied.

The run-time feed may be under development by a developer, and so it may not be active. For example, the URL to the run-time feed may not be live or accessible, and thus a "404 error" may be encountered if the URL of the run-time feed is requested. For instance, the application 23 that is under development may reference "foo.php ?action=getNewGalaxies", and though the referenced URI is not available (or currently active) during development of the application, the code or URI is desired to be included in the deployed software application 32 (e.g., the production web page), since the run-time feed will eventually become available and will be the run-time feed that is desired to be accessed by the run-time application 32. As another example, the run-time feed may be developed, but the designer of the application may not yet have access rights to access the run-time feed. For instance, access to such run-time data feed may be under negotiation.

The specified design-time feed, such as "employees-01.xml" in FIG. 4, may thus serve as a sample feed during development of the application 23, until the run-time feed goes live or active (or otherwise becomes available to the application), and thus the design-time feed may serve as a prototyping feed.

In certain embodiments, metadata associated with the application 23 under development may include information identifying the specified design-time feed for a corresponding run-time feed. For example, DREAMWEAVER has a concept of a "design-notes" file. Every web page (htm) page can have .mno (meta notes) file associated therewith. For instance, foo.htm in <web-site-root-folder> can have <web-site-root-folder>/_notes/foo.htm.mno, and within the .mno file are key-value pairs for storing page meta (extra) information. According to one embodiment of the present invention, such design-notes mechanism may include a new key-value pair to associate a design-time feed with a dataset-id. In one embodiment, the Spry XML Data Set of FIG. 4 may use the design-notes mechanism to add a new key-value pair to associate the specified "employees-01.xml" design-time feed with the "ds1" dataset-id.

An example of such a design-notes file, <web-site-root-folder>/_notes/foo.htm.mno, that may be generated according to one embodiment of the present invention is as follows:

<web-site-root-folder>/notes/foo.htm.mno
    spry_ds_<dsname>=<designtimefeed>
    Key: spry_ds_<dsname>
    Value: <xml file>
    <?xml version="1.0" encoding="utf-8" ?><info><infoitem key="spry_ds_ds1" value="employees-01.xml"/></info>

In the above example, the meta file (foo.html.mno) for web page foo.htm, includes "spry_ds_<dsname>" which specifies the design-time feed to be used in place of an unavailable run-time feed. In this example, the code in the meta file associates the "spry_ds_ds1" run-time feed with a design-time feed "employees-01.xml" to be used in place of the run-time feed during development when the run-time feed is unavailable. The actual web page "foo.htm" has the real definition of the run-time data feed, i.e., <dsname> is tied to <runtime feed> in the web page "foo.htm". Thus, the web page can be coded with reference to the actual run-time data feed, and the development tool 21 can, based on the web page's associated metadata (e.g., design-notes file) can determine a corresponding design-time data feed to be used during development in place of the referenced run-time data feed.

Figure 5:
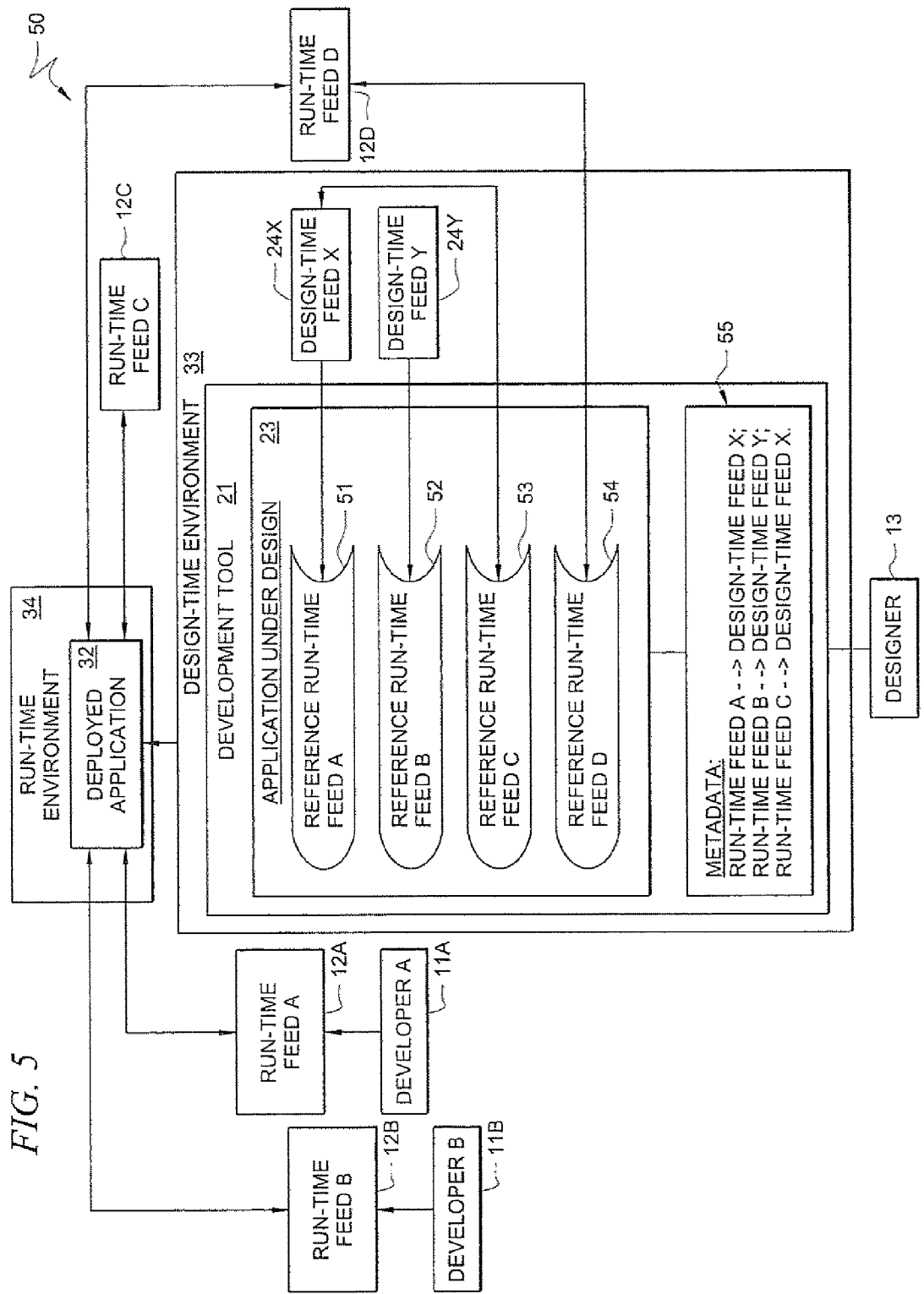
FIG. 5 shows another exemplary seen that employs a development tool according to one embodiment of the present invention.

Turning to FIG. 5, another exemplary scenario 50 that employs a development tool 21 according to one embodiment of the present invention is shown. In this example, a designer 13 is developing an application 23, which references various run-time data feeds A-D (as indicated by references 51-54 included in application 23). Further, during development of application 23, the referenced run-time data feeds A-C are not available for access by application 23. For instance, a developer 11A is developing run-time feed A (labeled 12A in FIG. 5), and a developer 11B is developing run-time feed B (labeled 12B in FIG. 5). Additionally, run-time feed C (labeled 12C in FIG. 5) is developed but is not available for access by application 23 (e.g., application 23 has not received proper access rights, and/or run-time data feed C (12C) is not stored to a location that is accessible by application 23). Run-time data feed D (labeled 12D in FIG. 5), on the other hand, is available for access by application 23 during development.

Metadata 55 is associated with application 23. For example, such metadata 55 may be contained in an associated design-notes file, as described above. In this example, such metadata identifies that designer 13 has specified a design-time feed X (labeled 24X in FIG. 5) for run-time feed A (12A), as well as for run-time feed C (12C), and that designer 13 has specified a design-time feed Y (labeled 24Y in FIG. 5) for run-time feed B (12B). Thus, in this example, a design-time feed X (24X) is available for access by application 23 during development, wherein such design-time feed X (24X) possesses characteristics that are representative of the unavailable run-time data feeds A (12A) and C (12C). Of course, in other embodiments, a separate design-time data feed may be specified for each of the unavailable run-time data feeds. Similarly, a design-time feed Y (24Y) is available for access by application 23 during development, wherein such design-time feed Y (24Y) possesses characteristics that are representative of the unavailable run-time data feed B (12B).

Thus, as shown in FIG. 5, during the development environment 33, development tool 21 accesses design-time feed X (24X) in place of the referenced run-time data feeds A (12A) and C (12C), and accesses design-time feed Y (24Y) in place of the referenced run-time data feed B (12B), per the correlations defined in the metadata 55. Because run-time data feed D (12D) is available during development environment 33, development tool 21 accesses such run-time data feed D, rather than a design-time feed that represents such run-time data feed D. When deployed, the deployed application 32 contains the references 51-54 to the run-time feeds 12A-12D, and thus such deployed application 32 accesses the run-time data feeds 12A-12D instead of any of the design-time feeds that may have been accessed by development tool 21.

Figure 6A:
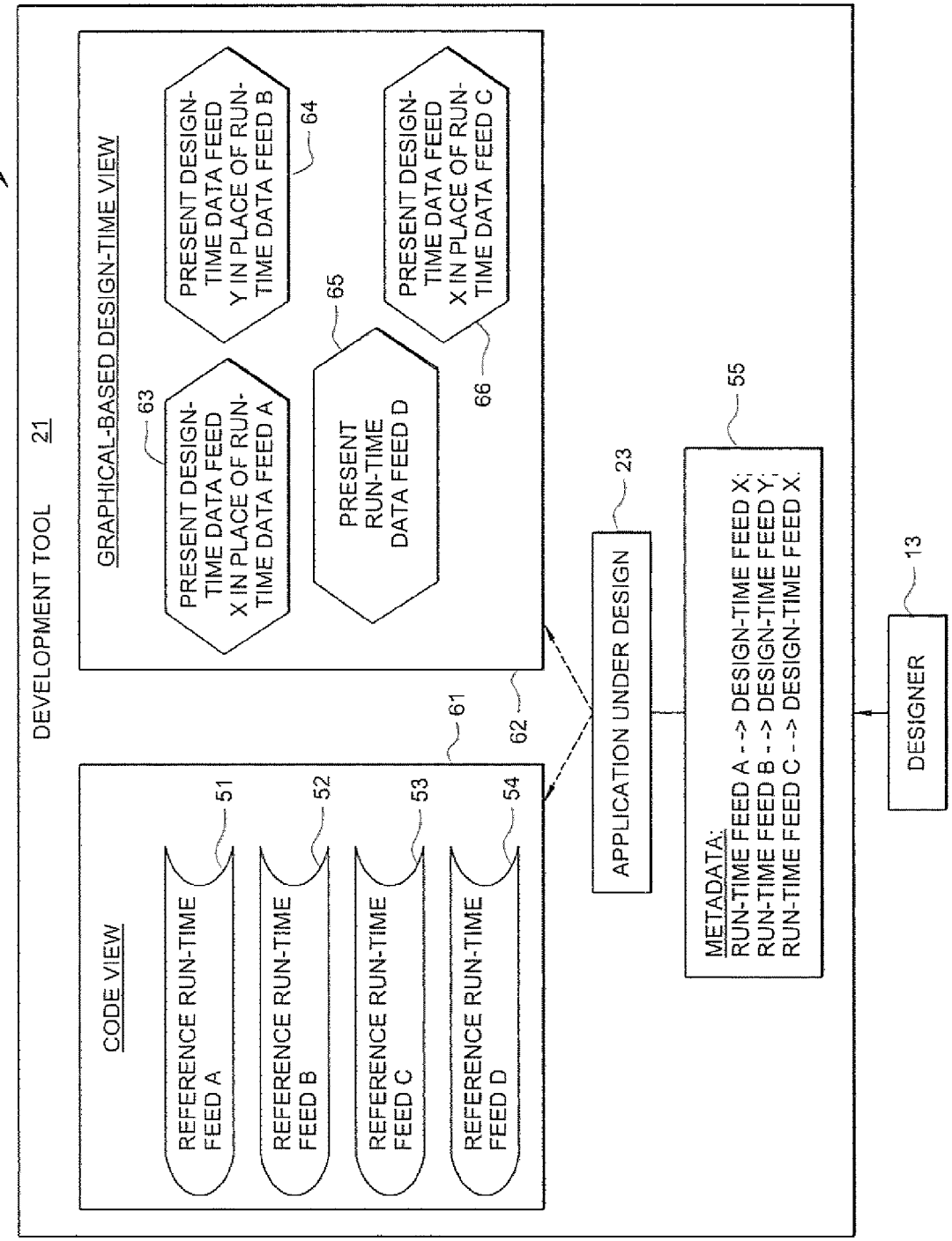
FIGS. 6A-6B show an example of the development environment and run-time environment that may be present for the exemplary scenario presented in FIG. 5, respectively.
Figure 6B:
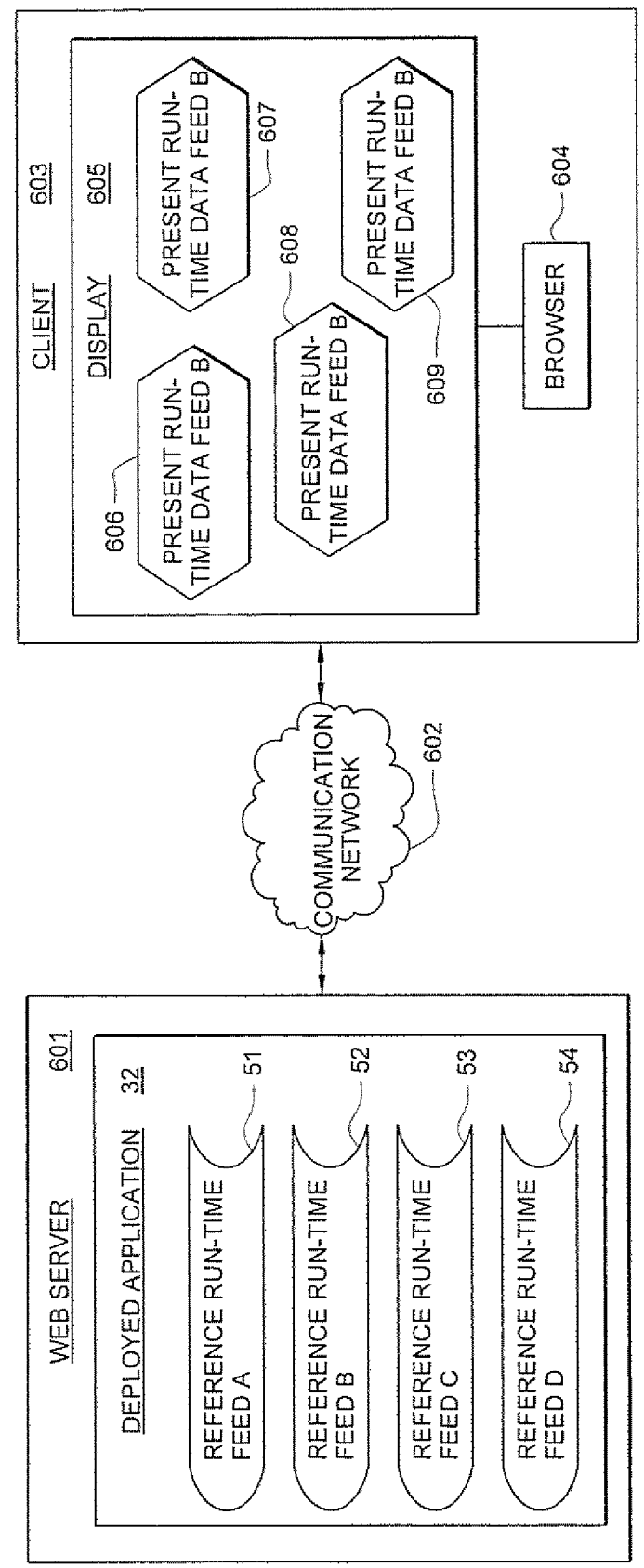

Turning now to FIGS. 6A-6B, an example of the development environment 33 and run-time environment 34 that may be present for the exemplary scenario presented in FIG. 5 are shown, respectively. FIG. 6A shows an example of development environment 33 according to one embodiment of the present invention. As mentioned above, an IDE, such as DREAMWEAVER, may allow web developers to design web pages in both a code editor and a graphical-based design time environment. Thus, such an IDE may allow a designer 13 to develop an application 23 in an environment that includes both a text-based code view 61 and a graphical-based design view 62. The code view 61 renders the source code as text in a portion of the screen and allows the designer 13 to see and manipulate the source code in the document file. For example, the developer may write and edit HTML or Cascading Style Sheets (CSS) code in the code view 61. The design view 62, on the other hand, is a What You See Is What You Get (WYSIWYG) view of the document that allows the designer 13 to visually manipulate the interpreted and graphically laid-out version of the document, such as, for example, by dragging, dropping, cutting, and pasting visual components. As the designer 13 works, changes to the application 23 are reflected in both the code view 61 and the design view 62.

Thus, as described in the example of FIG. 5, application 23 contains references 51-54 to run-time data feeds A-D, and such references are presented in the code view 61 of the application 23 in this example. Further, as discussed above with FIG. 5, metadata 55 is associated with application 23, which specifies that design-time feed X is to be used in place of referenced run-time data feeds A and C, and design-time feed Y is to be used in place of run-time data feed B. Accordingly, development tool 21 presents the graphical-based design-time view 62 using the specified design-time data feeds in place of the referenced run-time data feeds that are present in the code view 61. In this example, design-time data feed X is presented in place of run-time data feed A (per metadata 55) as presentation output 63. Similarly, design-time data feed X is presented in place of run-time data feed C (per metadata 55) as presentation output 66. Also, design-time data feed Y is presented in place of run-time data feed B (per metadata 55) as presentation output 64. Finally, because the referenced run-time data feed D is available to the development environment, a corresponding design-time feed is not specified, and thus the referenced run-time data feed D is presented in graphical view 62 as presentation output 65. Thus, as this example illustrates, the design-time feeds X and Y can be used by development tool 21 in place of the unavailable referenced run-time feeds A-C to aid designer 13 in proceeding with the design of application 23. For instance, the designer 13 can visualize (and edit) the graphical presentation 62 for the unavailable referenced run-time data feeds A-C because representative design-time data feeds X and Y are presented in their place.

FIG. 6B shows an example of run-time environment 34 according to one embodiment of the present invention. In this example, the application 23 developed in the development environment 33 of FIG. 6A is a webpage, and is thus deployed as deployed webpage 32 on a web server 601. Web server 601 may be communicatively coupled to a communication network 602, such as the Internet or other communication network, whereby clients, such as client 603 may access, via such communication network, deployed webpage 32. As is well-known in the art, client 603 may have a web browser application 604 executing thereon to read the deployed webpage 32 and generate a presentation defined by such webpage 32 to the client's display 605. As described in the example of FIG. 5, the deployed webpage 32 contains references 51-54 to run-time data feeds A-D. As such, the deployed webpage 32 results in presentation of the referenced run-time data feeds A-D on display 605, as indicated by presentation outputs 606-609.

While the above example is illustrative of developing and deploying a webpage application that is accessible via a communication network by clients, application of the concepts presented herein are not limited to development and deployment of webpages. Rather, the development tool 21 may employ design-time data feeds in the manner described herein for development of any type of software applications, wherein once deployed such software applications may reside on and execute locally on a given computer (e.g., on a "client" computer), the deployed software application may reside and/or execute on a remote server that is accessible by clients via a communication network, and/or any other desired run-time environment 34 may be employed.

FIG. 7 shows a flow diagram illustrating an exemplary operational flow of software development tool 21 according to one embodiment of the present invention. In operational block 71, the software development tool 21 receives identification of a design-time data feed for at least one run-time data feed that is referenced in a software application under development. For instance, in the example of FIG. 4, the software development tool receives identification of the "employees-01.xml" design-time data feed for the unavailable run-time data feed "ds1". In operational block 72, the software development tool 21 accesses the design-time data feed in place of the referenced run-time data feed. Thus, for instance, in the development environment 33 shown in FIG. 6A, the specified design-time data feeds may be presented by the development tool 21 in a graphical-based view 62 in place of the unavailable run-time data feeds that are referenced in the code view 61.

FIG. 8 shows a flow diagram illustrating another exemplary operational flow diagram of software development tool 21 according to one embodiment of the present invention. In operational block 81, the software development tool 21 determines whether access to a run-time feed referenced in a software application under development is available to such software application. For example, in FIG. 4 described above, the development tool 21 determines that a referenced run-time data feed "ds1" is not available for access by the application 23 that is under development. In block 82, when determined as unavailable, the software development tool 21 prompts a user (e.g., designer 13) to define a design-time feed to be used by the software development tool 21 in place of the referenced run-time feed. For instance, in FIG. 4, window 45 is presented to prompt the user to specify a design-time feed to be used by the development tool 21 in place of the referenced ds1 data feed.

In operational block 83, when determined as unavailable, the software development tool 21 accesses the corresponding defined design-time feed in place of the referenced run-time feed. Thus, for instance, in the development environment 33 shown in FIG. 6A, the specified design-time data feeds may be presented by the development tool 21 in a graphical-based view 62 in place of the unavailable run-time data feeds that are referenced in the code view 61. In operational block 84, when the referenced run-time data feed is determined as being available, the software development tool 21 accesses the referenced run-time data feed. For instance, in the examples of FIGS. 5-6A, the software development tool 21 accesses the referenced run-time data feed D, which is available for access by such development environment 33.

FIG. 9 shows a flow diagram illustrating yet, another exemplary operational flow of software development tool 21 according to one embodiment of the present invention. In operational block 91, the software development tool 21 determines, from metadata 55 associated with a software application 23 under development, whether a design-time data feed is defined for at least one run-time data feed referenced in the software application 23 under development. As described above, such metadata may be contained in an associated design-notes file for the application under development. For any determined design-time data feed defined for at least one run-time data feed referenced in the application 23 under development, the software development tool 21 accesses such design-time data feed in place of the referenced at least one run-time data feed for which the design-time feed is defined, in operational block 92.

In view of the above, in certain embodiments, a run-time feed may be specified, and if it is not available, then the development tool may prompt the software application developer to specify a corresponding design-time feed. The developer may continue to code the software application under development with reference to the run-time feed, which is not yet available, and the development tool correlates such references to the corresponding design-time feed. In certain embodiments, the development tool may recognize when the run-time feed becomes available, and may thus autonomously switch to use the run-time feed when it is so available. In this manner, if the run-time feed for which a design-time feed has been specified ever becomes unavailable during the application development stage (e.g., if the server on which the run-time feed resides is temporarily unavailable, etc.), the development tool may autonomously switch to use the specified design-time feed instead of interrupting the software application development workflow. Of course, the application developer may be notified of such switch to the design-time feed, or the developer may be prompted to authorize such a switch before the development tool does so. In other embodiments, the development tool may prompt the developer when the run-time feed becomes available to inquire as to whether to continue using the design-time feed or the run-time feed. In still other embodiments, once the run-time feed becomes available, the developer may interact with the development tool to remove the associated metadata specifying the design-time feed to be used in place of the run-time feed.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 10:
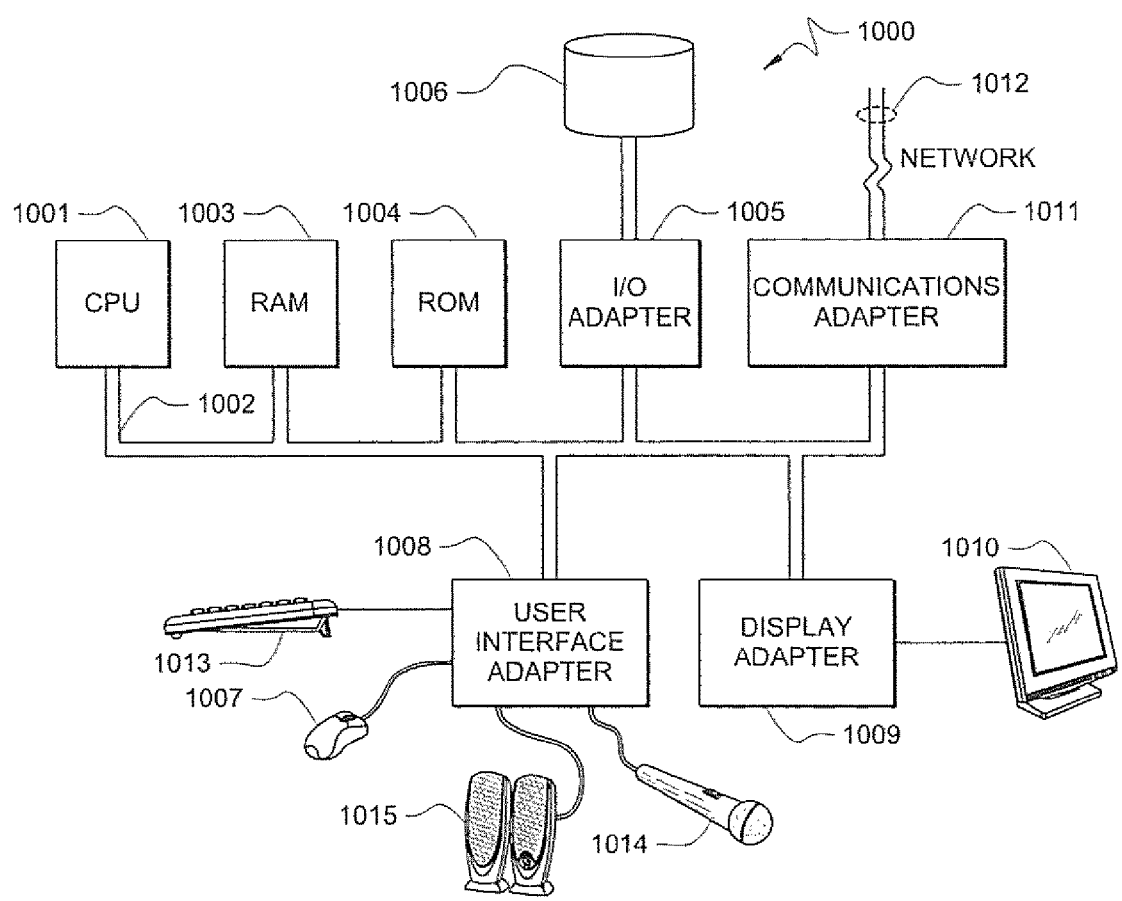
FIG. 10 shows an exemplary system on which a software development tool may be implemented according to one embodiment of the present invention.

FIG. 10 illustrates an exemplary computer system 1000 on which the software development tool 21 may be implemented according to one embodiment of the present invention. Central processing unit (CPU) 1001 is coupled to system bus 1002. CPU 1001 may be any general-purpose CPU. The present invention is not restricted by the architecture of CPU 1001 (or other components of exemplary system 1000) as long as CPU 1001 (and other components of system 1000) supports the inventive operations as described herein. CPU 1001 may execute the various logical instructions according to embodiments of the present invention. For example, CPU 1001 may execute machine-level instructions according to the exemplary operational flows described above in conjunction with FIGS. 7-9.

Computer system 1000 also preferably includes random access memory (RAM) 1003, which may be SRAM, DRAM, SDRAM, or the like. Computer system 1000 preferably includes read-only memory (ROM) 1004 which may be PROM, EPROM, EEPROM, or the like. RAM 1003 and ROM 1004 hold user and system data and programs, as is well known in the art.

Computer system 1000 also preferably includes input/output (I/O) adapter 1005, communications adapter 1011, user interface adapter 1008, and display adapter 1009. I/O adapter 1005, user interface adapter 1008, and/or communications adapter 1011 may, in certain embodiments, enable a user to interact with computer system 1000 in order to input information, such as specifying a design-time data feed, as described above.

I/O adapter 1005 preferably connects to storage device(s) 1006, such as one or more of hard drive, compact disc (CD) drive, floppy disk drive, tape drive, etc. to computer system 1000. The storage devices may be utilized when RAM 1003 is insufficient for the memory requirements associated with storing data for operations of the development tool 21. Communications adapter 1011 is preferably adapted to couple computer system 1000 to network 1012, which may enable information to be input to and/or output from system 1000 via such network 1012 (e.g., the Internet or other wide-area network, a local-area network, a public or private switched telephony network, a wireless network, any combination of the foregoing). User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010 to, for example, display information pertaining to an application under development, such as code view 61 and graphical-based design-time view 62 of FIG. 6A, according to certain embodiments of the present invention.

It shall be appreciated that the present invention is not limited to the architecture of system 1000. For example, any suitable processor-based device may be utilized for implementing development tool 21, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by a software development tool, identification of a design-time data feed for at least one run-time data feed that is referenced in a software application under development, wherein one or more displayed elements are displayed in the software application under development and reference the at least one run-time data feed, wherein the referenced at least one run-time data feed provides run-time data for display at run-time and the design-time data feed provides design-time data for display if the run-time data is not accessible by the software development tool at design-time;
storing said identification of said design-time data feed for the referenced at least one run-time data feed as metadata associated with said software application under development, wherein the identification of the design-time data feed is a key in a key-value pair, wherein the key-value pair associates the design-time data feed with the one or more displayed elements, wherein the design-time data feed is a database;
accessing, by the software development tool at design-time, the design-time data feed in place of the referenced at least one run-time data feed; and
displaying, via the software development tool, the one or more displayed elements with the design-time data from the design-time data feed, wherein the design-time data feed is separate from the software application under development.

2. The method of claim 1 wherein said storing comprises:
storing said identification of said design-time data feed for the referenced at least one run-time data in a design-notes file associated with said software application under development.

3. The method of claim 1 wherein said software application under development comprises a web page.

4. The method of claim 1 wherein the design-time data feed is representative of the referenced at least one run-time data feed.

5. The method of claim 1 wherein the design-time data feed comprises characteristics consistent with the referenced at least one run-time data feed.

6. The method of claim 5 wherein the characteristics comprise whether the referenced at least one run-time data feed is a dynamic or static feed.

7. The method of claim 5 wherein the characteristics comprise being a streaming feed.

8. The method of claim 1 further comprising:
when the software application under development is developed, deploying the developed software application in a run-time environment, wherein the deployed software application accesses the referenced at least one run-time data feed.

9. The method of claim 1 wherein said receiving comprises:
receiving, by a software development tool, identification of said design-time data feed for a plurality of run-time data feeds that are referenced in the software application under development; and wherein said accessing comprises accessing, by the software development tool at design-time, the design-time data feed in place of the referenced plurality of run-time data feeds.

10. The method of claim 1 further comprising:
determining, by the software development tool, that the software application under development contains a reference to a run-time data feed that is not available for access by the software application under development; and
responsive to said determining, outputting, by the software development tool, a prompt requesting identification of a design-time data feed for the unavailable run-time data feed.

11. The method of claim 10 wherein the referenced run-time data feed is not available for access by the software application under development for at least one of the following reasons:
the referenced run-time data feed is not yet developed, the referenced run-time data feed is not yet active, the referenced run-time data feed is not yet stored to a location accessible by the software application under development, and the software application under development does not yet have access rights granted to it for accessing the referenced run-time data feed.

12. A method comprising:
determining, by a software development tool, whether access to a run-time data feed referenced in a software application under development is available for access by said software application under development;
when determined to be unavailable, the software development tool outputting a prompt requesting definition of a design-time data feed to be used by the software development tool in place of the referenced run-time data feed;
storing an identification of said design-time data feed as metadata associated with said software application under development, wherein the identification of the design-time data feed is a key in a key-value pair, wherein the key-value pair associates the design-time data feed with one or more displayed elements, wherein the design-time data feed is a database, wherein the one or more displayed elements are displayed in the software application under development and reference the run-time data feed, wherein the referenced run-time data feed provides run-time data for display at run-time and the design-time data feed provides design-time data for display if the run-time data is not accessible by the software development tool at design-time; and
displaying, via the software development tool, the one or more displayed elements with the design-time data from the design-time data feed, wherein the design-time data feed is separate from the software application under development.

13. The method of claim 12 further comprising:
when determined to be unavailable, the software development tool accessing a corresponding user-defined design-time data feed in place of the referenced run-time data feed.

14. The method of claim 13 further comprising:
determining, by the software development tool, the corresponding user-defined design-time data feed to access in place of the referenced run-time data feed.

15. The method of claim 13 further comprising:
when determined to be available, the software development tool accessing the referenced run-time data feed.

16. The method of claim 12 wherein said determining comprises:
determining if the referenced run-time data feed is not available for access by the software application under development for at least one of the following reasons:
the referenced run-time data feed is not yet developed, the referenced run-time data feed is not yet active, the referenced run-time data feed is not yet stored to a location accessible by the software application under development, and the software application under development does not yet have access rights granted to it for accessing the referenced run-time data feed.

17. A method comprising:
determining, by a software development tool, from metadata associated with a software application under development, whether a design-time data feed is defined for at least one run-time data feed referenced in the software application under development;
for any determined design-time data feed defined for the at least one run-time data feed referenced in the application under development, the software development tool accessing said design-time data feed in place of the referenced at least one run-time data feed for which the design-time data feed is defined;
wherein one or more displayed elements are displayed in the software application under development and reference the at least one run-time data feed, wherein the referenced at least one run-time data feed provides run-time data for display at run-time and the design-time data feed provides design-time data for display if the run-time data is not accessible by the software development tool at design-time;
wherein an identification of the design-time data feed is stored as metadata associated with said software application under development, wherein the identification of the design-time data feed is a key in a key-value pair, wherein the key-value pair associates the design-time data feed with the one or more displayed elements, wherein the design-time data feed is a database; and
displaying, via the software development tool, the one or more displayed elements with the design-time data from the design-time data feed, wherein the design-time data feed is separate from the software application under development.

18. The method of claim 17 wherein the metadata associated with the software application under development comprises:
a design-notes file associated with the software application under development.

19. The method of claim 17 wherein the design-time data feed is representative of the referenced at least one run-time data feed for which the design-time data feed is defined.

20. A system comprising:
a processor;
a memory; and
a software development environment that comprises a software development tool;
said software development tool operable to determine whether a design-time data feed is defined for at least one run-time data feed referenced in a software application under development;
said software development tool further operable to access any determined design-time data feed in place of the referenced at least one run-time data feed for which the design-time data feed is defined;
wherein one or more displayed elements are displayed in the software application under development and reference the at least one run-time data feed, wherein the referenced at least one run-time data feed provides run-time data for display at run-time and the design-time data feed provides design-time data for display if the run-time data is not accessible by the software development tool at design-time;
wherein an identification of the design-time data feed is stored as metadata associated with said software application under development, wherein the identification of the design-time data feed is a key in a key-value pair, wherein the key-value pair associates the design-time data feed with the one or more displayed elements, wherein the design-time data feed is a database; and
said software development tool further operable to display the one or more displayed elements with the design-time data from the design-time data feed, wherein the design-time data feed is separate from the software application under development.

21. The system of claim 20 wherein said software development tool is operable to present a code view of the software application under development, wherein reference to the referenced at least one run-time data feed is presented in the code view.

22. The system of claim 21 wherein said software development tool is further operable to present a graphical-based design-time view of the software application under development, wherein said determined design-time data feed is presented in the graphical-based design-time view in place of the referenced at least one run-time data feed for which the design-time data feed is defined.

23. The system of claim 20 further comprising:
a run-time environment, wherein the software application under development, when deployed in the run-time environment, accesses the referenced at least one run-time data feed.

24. Computer-executable software code stored on a non-transitory computer-readable storage medium, which when executed by a computer provides a software development environment that comprises a software development tool with which a designer can interact to develop a software application, and when executed by the computer the computer-executable software code causes the computer to perform a method comprising:
receiving input identifying a design-time data feed for at least one run-time data feed that is referenced in a software application under development, wherein one or more displayed elements are displayed in the software application under development and reference the at least one run-time data feed, wherein the referenced at least one run-time data feed provides run-time data for display at run-time and the design-time data feed provides design-time data for display if the run-time data is not accessible by the software development tool at design-time;
storing said identification of said design-time data feed for the referenced at least one run-time data feed as metadata associated with said software application under development, wherein the identification of the design-time data feed is a key in a key-value pair, wherein the key-value pair associates the design-time data feed with the one or more displayed elements, wherein the design-time data feed is a database;
accessing the design-time data feed in place of the referenced at least one run-time data feed; and
displaying the one or more displayed elements with the design-time data from the design-time data feed, wherein the design-time data feed is separate from the software application under development.

25. The computer-executable software code of claim 24 wherein the design-time data feed comprises at least one of: a dynamic feed and a static feed.

26. The computer-executable software code of claim 24 wherein the design-time data feed comprises a streaming feed.

* * * * *

UNITED STATES PATENT AND TRADEMARK OFFICE
CERTIFICATE OF CORRECTION

| | | |
|---|---|---|
| PATENT NO. | : 7,941,783 B1 | Page 1 of 1 |
| APPLICATION NO. | : 11/733620 | |
| DATED | : May 10, 2011 | |
| INVENTOR(S) | : Amit C. Kishnani and Jorge Taylor | |

It is certified that error appears in the above-identified patent and that said Letters Patent is hereby corrected as shown below:

Claim 2, line 57 Column 14
Insert the word --feed-- following the word "data"

Claim 5, line 65 Column 14
Delete "claim 1" and insert --claim 4-- in place thereof Claim 6, line 3 Column 15
Insert the word --a-- immediately preceding the word "static"

Signed and Sealed this
Twenty-eighth Day of June, 2011

David J. Kappos
*Director of the United States Patent and Trademark Office*